US 8,898,271 B2

(12) United States Patent
Li et al.

(10) Patent No.: US 8,898,271 B2
(45) Date of Patent: Nov. 25, 2014

(54) SYSTEM AND METHOD FOR SUPPORTING ACCURATE LOAD BALANCING IN A TRANSACTIONAL MIDDLEWARE MACHINE ENVIRONMENT

(75) Inventors: Zhenyu Li, Beijing (CN); Xuhui Chen, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 188 days.

(21) Appl. No.: 13/410,128

(22) Filed: Mar. 1, 2012

(65) Prior Publication Data

US 2013/0086238 A1    Apr. 4, 2013

Related U.S. Application Data

(60) Provisional application No. 61/541,063, filed on Sep. 29, 2011.

(51) Int. Cl.
*G06F 15/173* (2006.01)
*G06F 15/16* (2006.01)
*H04L 29/08* (2006.01)
*G06F 9/50* (2006.01)

(52) U.S. Cl.
CPC ............ *G06F 9/505* (2013.01); *H04L 67/1002* (2013.01); *H04L 67/288* (2013.01); *H04L 67/1095* (2013.01)
USPC .......................................... 709/223; 709/226

(58) Field of Classification Search
CPC .................... H04L 41/0213; H04L 29/08072; H04L 29/06
USPC .................................................. 709/223, 226
See application file for complete search history.

(56) References Cited

U.S. PATENT DOCUMENTS

| | | | | |
|---|---|---|---|---|
| 6,324,580 B1 * | 11/2001 | Jindal et al. | .................... | 709/228 |
| 6,327,622 B1 * | 12/2001 | Jindal et al. | .................... | 709/228 |
| 6,484,143 B1 * | 11/2002 | Swildens et al. | .............. | 705/1.1 |
| 6,928,477 B1 * | 8/2005 | Leymann et al. | ............. | 709/226 |
| 6,985,940 B1 * | 1/2006 | Jenkin | ............................ | 709/224 |
| 6,985,956 B2 * | 1/2006 | Luke et al. | .................... | 709/229 |
| 7,062,556 B1 * | 6/2006 | Chen et al. | .................... | 709/226 |
| 7,421,509 B2 * | 9/2008 | Lolayekar et al. | ............. | 709/235 |
| 7,454,458 B2 * | 11/2008 | Islam et al. | ................... | 709/203 |
| 7,620,687 B2 * | 11/2009 | Chen et al. | .................... | 709/205 |

(Continued)

OTHER PUBLICATIONS

Aiken, et al., Microsoft Computer Dictionary 2002, p. 459, "Network Time Protocol."*

(Continued)

*Primary Examiner* — Lynn Feild
*Assistant Examiner* — Timothy Sowa
(74) *Attorney, Agent, or Firm* — Meyer IP Law Group

(57) ABSTRACT

A system and method can support accurate load balancing in a transactional middleware machine environment with a plurality of transactional middleware machines. A service response time table can be maintained on each transactional middleware machine in the transactional middleware machine environment, wherein said service response time table is adaptive to be used by a client on the transactional middleware machine to make routing decisions for a service request. The transactional middleware machine environment can further include a plurality of synchronization servers, with each said synchronization server associated with a transactional middleware machine in the transactional middleware machine environment. The plurality of synchronization servers operates to periodically synchronize the service response time table on each said transactional middleware machine in the transactional middleware machine environment.

20 Claims, 2 Drawing Sheets

(56) References Cited

U.S. PATENT DOCUMENTS

| | | |
|---|---|---|
| 7,752,262 B2* | 7/2010 | Di Giulio et al. ............. 709/203 |
| 7,962,916 B2* | 6/2011 | Ramanathan ................. 718/105 |
| 2003/0037173 A1* | 2/2003 | Pace et al. .................... 709/310 |
| 2005/0027862 A1* | 2/2005 | Nguyen et al. ................ 709/225 |
| 2005/0086263 A1* | 4/2005 | Ngai et al. ................. 707/104.1 |
| 2005/0120095 A1* | 6/2005 | Aman et al. .................. 709/219 |
| 2005/0204054 A1* | 9/2005 | Wang et al. ................... 709/232 |
| 2011/0154073 A1* | 6/2011 | Wang et al. ................... 713/320 |

OTHER PUBLICATIONS

Bryhni, et al. (2000). A comparison of load balancing techniques for scalable web servers. Network, IEEE, 14(4), pp. 58-64.*
International Search Report and Written Opinion dated Nov. 29, 2012, International Application No. PCT/US2012/057369, 8 pages.

* cited by examiner

SYSTEM AND METHOD FOR SUPPORTING ACCURATE LOAD BALANCING IN A TRANSACTIONAL MIDDLEWARE MACHINE ENVIRONMENT

CLAIM OF PRIORITY

This application claims the benefit of priority on U.S. Provisional Patent Application No. 61/541,063, entitled "SYSTEM AND METHOD FOR SUPPORTING ACCURATE LOAD BALANCING IN A TRANSACTIONAL MIDDLEWARE MACHINE ENVIRONMENT" filed Sep. 29, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a transactional middleware machine environment.

BACKGROUND

A transactional middleware system, or a transaction oriented middleware, includes enterprise application servers that can process various transactions within an organization. With the developments in new technologies such as high performance network and multiprocessor computers, there is a need to further improve the performance of the transactional middleware. These are the generally areas that embodiments of the invention are intended to address.

SUMMARY

Described herein is a system and method for supporting accurate load balancing in a transactional middleware machine environment with a plurality of transactional middleware machines. A service response time table can be maintained on each transactional middleware machine in the transactional middleware machine environment, wherein said service response time table is adaptive to be used by a client on the transactional middleware machine to make routing decisions for a service request. The transactional middleware machine environment can further include a plurality of synchronization servers, with each said synchronization server associated with a transactional middleware machine in the transactional middleware machine environment. The plurality of synchronization servers operates to periodically synchronize the service response time table on each said transactional middleware machine in the transactional middleware machine environment.

DETAILED DESCRIPTION

Figure 1:
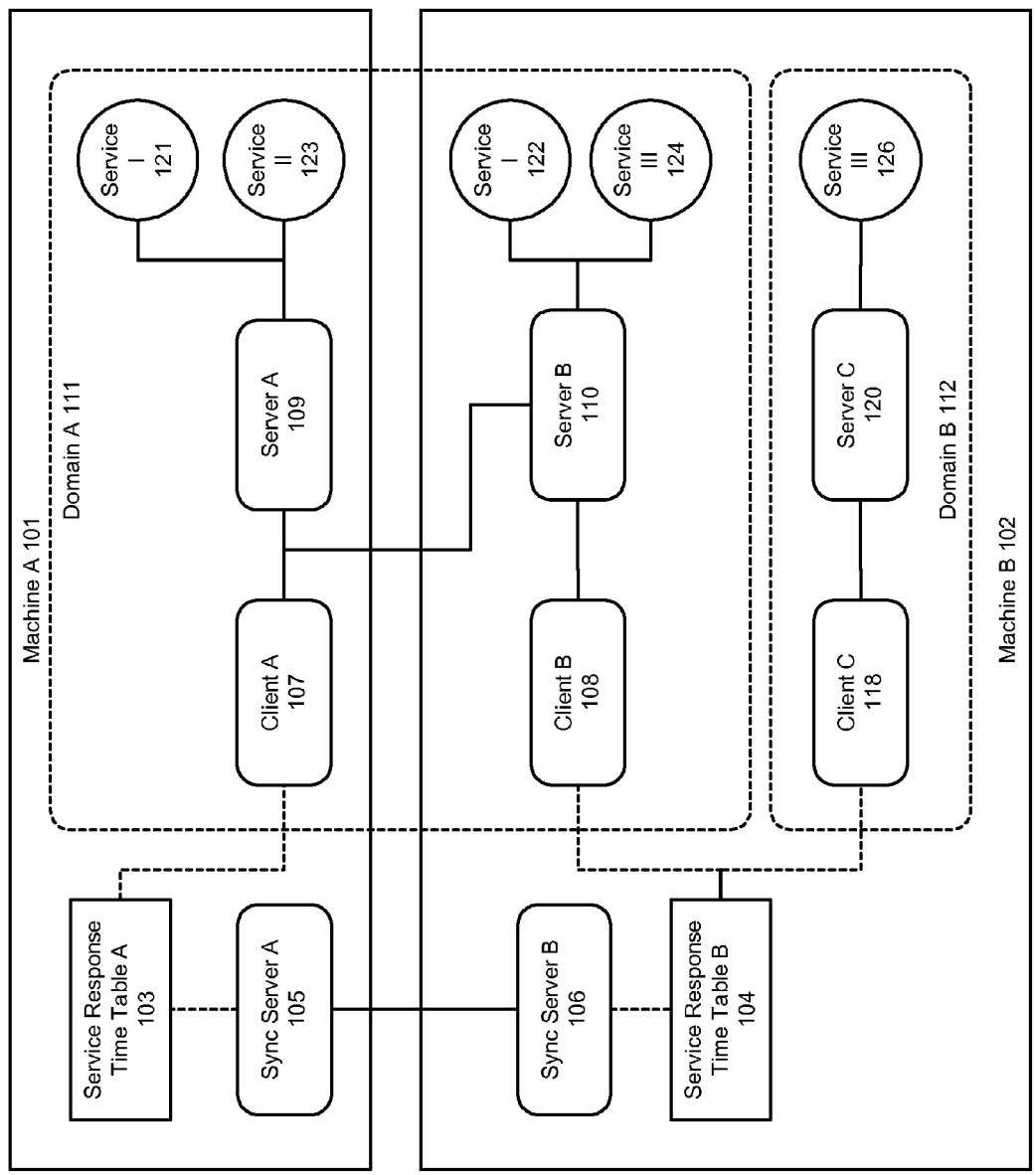
FIG. 1 shows an illustration of a transactional middleware machine environment that supports accurate load balancing, in accordance with an embodiment of the invention.

Described herein is a system and method for supporting a transactional middleware system that can take advantage of fast machines with multiple processors, and a high performance network connection. A dynamic request broker can perform accurate load balancing for transactional services in multiple-machine environments based on the dynamic load instead of the static load. The transactional middleware machine environment can comprise a plurality of transactional middleware machines, wherein each said transactional middleware machine maintains a service response time table that is adaptive to be used by a client on the transactional middleware machine to make routing decisions for a service request. The transactional middleware machine environment can further comprise a plurality of synchronization servers, wherein each said synchronization server is associated with a said transactional middleware machine in the transactional middleware machine environment. The plurality of synchronization servers operates to periodically synchronize the service response time tables on the plurality of transactional middleware machines.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, Tuxedo is a set of software modules that enables the construction, execution, and administration of high performance, distributed business applications and has been used as transactional middleware by a number of multi-tier application development tools. Tuxedo is a middleware platform that can be used to manage distributed transaction processing in distributed computing environments. It is a proven platform for unlocking enterprise legacy applications and extending them to a services oriented architecture, while delivering unlimited scalability and standards-based interoperability.

In accordance with an embodiment of the invention, a transactional middleware system, such as a Tuxedo system, can take advantage of fast machines with multiple processors, such as an Exalogic middleware machine, and a high performance network connection, such as an Infiniband (IB) network.

Accurate Load Balancing in Multiple-Machine Environments

In accordance with an embodiment of the invention, a multiple-machine middleware server environment, such as an Exalogic middleware machine environment, allows intensive cross-machine calls. The load information between machines can be synchronized for more accurate load balancing in the multiple-machine environments. Dynamic load can be introduced for transactional services such as Tuxedo services. The load balance can be performed based on the dynamic load instead of the static load.

FIG. 1 shows an illustration of a transactional middleware machine environment that supports accurate load balancing, in accordance with an embodiment of the invention. As shown in FIG. 1, the transactional middleware machine environment includes a plurality of transactional middleware machines, e.g. Machine A 101 and Machine B 102. Each transactional middleware machine can maintain a service response time table that contains services response time information for each machine. For example, Machine A includes a service response time table, Service Response Time Table A 103, while Machine B includes a service response time table, Service Response Time Table B 104.

Additionally, each transactional middleware machine can include a synchronization server that is responsible for synchronizing load information with other transactional middleware machines in the transactional middleware machine environment. In the example as shown in FIG. 1, Machine A includes synchronization server, Sync Server A 105, while Machine B includes a synchronization server, Sync Server B 106. Sync Server A and Sync Server B can communicate directly with each other in order to synchronize load information on both Machine A and Machine B. Sync Server A 105 and Sync Server B 106 may be hardware compute nodes.

Also as shown in FIG. 1, the transactional middleware machine environment supports multiple transactional domains, e.g. Domain A 111 and Domain B 112. Domain A includes two transactional application servers: Server A 109 on Machine A and Server B 110 on Machine B. Server A provides two transactional services: Service I 121 and Service II 123, and Server B also provides two transactional services: Service I 122 and Service III 124. Domain B includes one transactional application server, Server C 120, which provides only one transactional service, Service III 126. Server C 120 may be hardware compute nodes.

In accordance with an embodiment of the invention, a client on a transactional middleware machine can use a service response time table on the transactional middleware machine to make routing decisions for requesting a service provided by the transactional platform. The client can use the service response time table to decide which transactional server provides a transactional service with the shortest service response time.

For example, when Client A 107 wants to locate a Service I in Domain A, Client A can look up the service response time table A 103 on Machine A to determine which server to send a service request message. Then, Client A can select a faster server from Server A and Server B based on their current service response time stored in the service response time table A 103.

In accordance with an embodiment of the invention, every time a transactional application server has performed a service, the transactional middleware machine that contains the transactional application server can update the service response time table on the machine. The machine can synchronize this service response time table with other service response time tables on other machines periodically using the synchronization servers, in order to update the service response information for various servers. In the above example, when Server A 109 on Machine A 101 finishes providing Service I 121 for Client A 107, Sync Server A 105 on Machine A 101 can update the Service Response Time Table A 103 correspondently.

In accordance with an embodiment of the invention, instead of synchronizing service response information via the synchronization servers, a transactional application server can embed a service response time in a service response message that is returned to the client. In this scenario, the client can update the service response time table independently from the synchronization server.

In the example as shown in FIG. 1, when Server A 109 is selected to provide Service I 121, Server A 109 can embed the service response information in a service response message that is sent back to Client A 107, which in turn can update the Service Response Time Table A 103. Similarly, when Server B 110 is selected to provide Service I 122, Server B 110 can embed the service response information in a service response message that is sent back to Client A 107, which in turn can update the Service Response Time Table A 103 directly without a need to wait for the synchronization between Machine A and Machine B.

Figure 2:
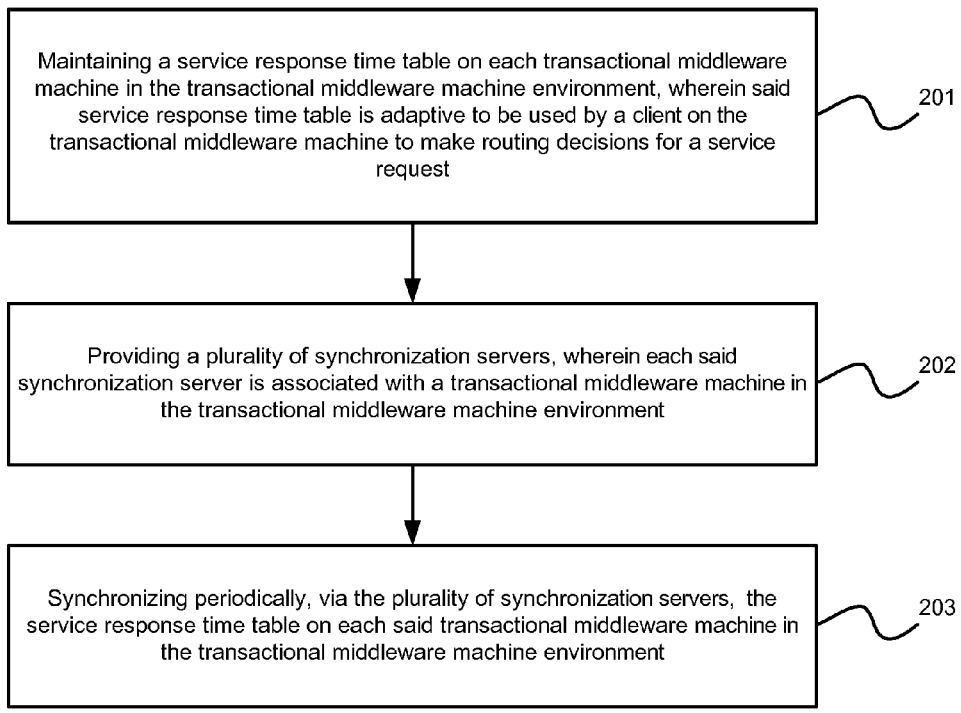
FIG. 2 illustrates an exemplary flow chart for supporting accurate load balancing in a transactional middleware machine environment, in accordance with an embodiment of the invention.

FIG. 2 illustrates an exemplary flow chart for supporting accurate load balancing in a transactional middleware machine environment, in accordance with an embodiment of the invention. As shown in FIG. 2, at step 201, the system can maintain a service response time table on each transactional middleware machine in the transactional middleware machine environment. Each said service response time table is adaptive to be used by a client on the transactional middleware machine to make routing decisions for a service request. Then, at step 202, the transactional middleware machine environment includes a plurality of synchronization servers. Each said synchronization server is associated with a transactional middleware machine in the transactional middleware machine environment. Finally, at 203, the plurality of synchronization servers can periodically synchronize the service response time table on each said transactional middleware machine in the transactional middleware machine environment.

Load Balancing Based on Dynamic Load

In accordance with an embodiment of the invention, a dynamic request broker can be supported in a transactional middleware machine environment to provide dynamic and precise load balancing for the transactional middleware machine platform, such as a Tuxedo.

balance algorithm can be designed to perform a quick set of calculations that can provide a good distribution of workload among the transactional servers, such as the servers in online transaction processing (OLTP) applications, which typically require short response time and high throughput. The system allows the users to garner more benefits from a multiple machine configuration, e.g. in an Exalogic middleware machine environment, with more cross-machine calls that are used to improve the efficiency of the system.

In accordance with an embodiment of the invention, dynamic load balancing algorithms that are based on the dynamic load can be provided for the transactional services. The dynamic load information can be synchronized between machines for more accurate load balancing in multiple machine environments.

From the client perspective, the purpose of load balancing is to minimize the response time for each request call. The load balancing decisions can be made dynamically based on the services response times. In other words, the system can continuously measure response times on a per-service request basis and can keep this information for subsequent service request routing decisions.

In accordance with an embodiment of the invention, a client can estimate the response time for every candidate server for processing each service request. The estimated response time can be calculated using the following formula:
Estimated Response Time=Network Time+Queue Waiting Time+Service Execution Time As shown in the above formula, the response time for processing a single Tuxedo service request can include at least a network time, a queue wait time, and a service execution time. The network time measures the time that it takes to transmit a request call from the originating server machine to the server machine and to transmit the corresponding reply back to the originating server machine. The queue waiting time measures the time that a request call waits in the server queue before it gets the service. The service execution time measures the time that it takes the server to serve the request.

Additionally, in the above formula, both the network time and service execution time can be an averaged time over a prescribed time period. In the case of the queue waiting time, it can be either an averaged queue waiting time over a defined period or the latest queue waiting time. The latest queue waiting time for a particular server can be continuously maintained on the machine where the server is located. Since the queue waiting time can vary significantly depending on the work load, a response time estimated using the latest queue waiting time can be more precise than the response time estimated using the averaged queue waiting time.

In the example of Tuxedo, the dedicated synchronization server on each Tuxedo machine can be responsible for the data collection and synchronization. Average service execution time can be collected by the synchronization server so that it can be synchronized among the peers. A similar approach can be used to synchronize the queue waiting time, since the latest data may only be kept in the node where the server locates. Alternatively, the data synchronization can be implemented by piggybacking load information on the service reply message that is returned to the client who requested for the service.

Additionally, the synchronization server on each Tuxedo machine can also be response for collecting the network time. The synchronization server can periodically send a special request to other Tuxedo machines to measure the network time between the Tuxedo machines.

Load Balancing Based on Static Load

In accordance with an embodiment of the invention, a load balance algorithm in a transactional middleware machine environment can depend on a static load that is defined for each service. This static load balancing algorithm can be used together with the dynamic load balancing algorithm in the transactional middleware machine environment. For example, the static load can be used when the dynamic load is unavailable.

Comparing with the dynamic load balancing approach, the static load balance algorithm is a simpler approach with trade-offs. For example, the static load may not reflect the exact real load at runtime, and the static load balance algorithm may not be accurate in a multiple-machine mode.

In the example of Tuxedo, a static load balancing algorithm implementation can use a parameter named Server Wkqueued to select a destination server from a set of candidate servers. Server Wkqueued is a parameter that indicates the current work load of the request queue. The routing of a service request can take place on the client side, based on comparing the values of Server Wkqueued for all server candidates.

Additionally, in a multiple-machine mode, another parameter, NETLOAD, which can be a constant value, can be added to the Server Wkqueued value for comparison. The NETLOAD parameter can specify the additional load to be added when computing the cost of sending a service request from one machine to another machine. NETLOAD can be a static value that is specified in the Tuxedo configuration file.

In accordance with an embodiment of the invention, two different strategies can be used for calculating Server Wkqueued according to different model of application.

Using a Periodic Accumulative Updating approach, the system can increase the value of the Server Wkqueued by the LOAD value of the service, when the service request is added to the server's request queue. The value of the Server Wkqueued is not decreased when the request is completed by the server. The Wkqueued value can increase linearly during an administrative check time period, and can be reset at the time of the administrative check, such as the sanity scan of servers in Tuxedo. One example of this approach is to update the value of Server Wkqueued using a Round-Robin (RR) algorithm, which can be used in a multiple machine mode.

Using a Real-Time Updating approach, the system can increase the value of the Server Wkqueued by the LOAD value of the service when service request is added to the request queue. The value of the Server Wkqueued is decreased by the LOAD value of the service upon the completion of the request by the server. This updating method maintains the Server Wkqueued in a real-time mode and can reflect the current queued work more accurately than the first approach. One example of this approach is to update the value of Server Wkqueued using a Real-Time (RT) algorithm, which can be used in a single machine mode.

The LOAD value of a service can be a static value specified in a Tuxedo configuration file, for example a default value for LOAD can be set as 70. Additionally, the LOAD value of a service can be specified as a relative load factor associated with a service instance.

In accordance with an embodiment of the invention, there can be tradeoffs associated with this static load balancing algorithm, since the static load balancing algorithm simplifies the dynamic request broker.

First, the service execution time in the dynamic request broker is reduced to a constant service LOAD in the static load balancing algorithm. Since the need of a service for computing resources can vary over its active lifetime, a static constant value may not reflect the real time work load level of the service. Additionally, since the service LOAD value can be assigned by Tuxedo Administrator in the configuration file, it relies highly on an Administrator's experiment to select an applicable LOAD value for the service.

Second, the average network time in the dynamic request broker is reduced to a constant NETLOAD in the static load balancing algorithm. The NETLOAD parameter does not take into account the fact that network cost to different target nodes may vary from network topology to network topology. And the network cost can be load sensitive and, therefore, not constant.

Third, in a multiple machine mode, the Round-Robin algorithm may not get the real time server load level, but only the statistics of the server load level. Additionally, a client may not get a true and current picture of the candidate servers located in remote nodes, since there is no sync-up mechanism among nodes. Thus, the remote queue workload value in the local node may be less accurate.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting load balancing in a transactional middleware machine environment with a plurality of transactional middleware machines, comprising:
    a plurality of service response time tables, wherein each transactional middleware machine in the transactional middleware machine environment includes at least one transactional server and a service response time table, wherein each said service response time table includes service response times for each said transactional server deployed in the transactional middleware machine environment;
    wherein each said service response time table is usable by a client on the associated transactional middleware machine to make routing decisions for a service request; and
    a plurality of synchronization servers, wherein each said synchronization server is associated with a transactional middleware machine in the transactional middleware machine environment;
    wherein the plurality of synchronization servers operates to periodically synchronize the transactional server response times included in the plurality of service response time tables in the transactional middleware machine environment.

2. The system of claim 1, wherein the transactional middleware machine environment includes one or more transactional domains and at least one transactional domain includes multiple said transactional servers that reside on different transactional middleware machines in the transactional middleware machine environment.

3. The system of claim 1, wherein at least one transactional service is provided on different transactional servers that reside on different transactional middleware machines in the transactional middleware machine environment.

4. The system of claim 1, wherein the service response time table is used by the client to decide which transactional server provides a transactional service with a shortest service response time.

5. The system of claim 1, wherein a said transactional middleware server updates the service response time table on an associated transactional middleware machine after the transactional middleware server finishes performing a transactional service.

6. The system of claim 1, wherein each said service response time in the service response time table is estimated based on at least one of a dynamic load and a static load.

7. The system of claim 1, wherein a transactional server on an associated transactional middleware machine embeds a service response time in a service response message that is returned to the client on another transactional middleware machine.

8. The system of claim 7, wherein the client operates to update the service response time table on the another transactional middleware machine using information in the service response time.

9. The system of claim 1, wherein a service response time in the service response time table for a service is a sum of a service execution time, a queue waiting time, and a network time;
    wherein the network time is a sum of a time required for a request to be transmitted to a transactional server and a time required for a reply generated and transmitted by the transactional server to be received.

10. The system of claim 9, wherein a synchronization server is responsible for periodically measuring said network time between machines.

11. A method for supporting accurate load balancing in a transactional middleware machine environment with a plurality of transactional middleware machines, comprising:
    maintaining a plurality of service response time tables, wherein each transactional middleware machine in the transactional middleware machine environment includes at least one transactional server and a service response time table, wherein each said service response time table includes service response times for each said transactional server deployed in the transactional middleware machine environment;
    wherein each said service response time table is usable by a client on the associated transactional middleware machine to make routing decisions for a service request;
    providing a plurality of synchronization servers, wherein each said synchronization server is associated with a transactional middleware machine in the transactional middleware machine environment; and synchronizing periodically, via the plurality of synchronization servers, the transactional server response times included in the plurality of service response time tables in the transactional middleware machine environment.

12. The method of claim 11, further comprising allowing the transactional middleware machine environment to include one or more transactional domains, and wherein at least one transactional domain includes multiple transactional servers that reside on different transactional middleware machines in the transactional middleware machine environment.

13. The method of claim 11, further comprising providing at least one transactional service on different transactional servers that reside on different transactional middleware machines in the transactional middleware machine environment.

14. The method of claim 11, further comprising using the service response time table to decide which transactional server provides a transactional service with a shortest service response time.

15. The method of claim 11, further comprising updating the service response time table on an associated transactional middleware machine after a said transactional middleware server finishes performing a said transactional service.

16. The method of claim 11, further comprising estimating each said service response time in the service response time table based on at least one of a dynamic load and a static load.

17. The method of claim 11, further comprising allowing a said transactional server on an associated transactional middleware machine to embed a service response time in a service response message that is returned to the client on another transactional middleware machine.

18. The method of claim 17, further comprising updating the service response time table on the another transactional middleware machine using information in the service response time.

19. The method of claim 11, further comprising allowing a service response time in the service response time table for a service to be a sum of a service execution time, a queue waiting time, and a network time;
  wherein the network time is a sum of a time required for a request to be transmitted to a transactional server and a time required for a reply generated and transmitted by the transactional server to be received.

20. The method of claim 19, further comprising periodically measuring said network time between machines.

* * * * *

UNITED STATES PATENT AND TRADEMARK OFFICE
CERTIFICATE OF CORRECTION

PATENT NO. : 8,898,271 B2  
APPLICATION NO. : 13/410128  
DATED : November 25, 2014  
INVENTOR(S) : Li et al.

It is certified that error appears in the above-identified patent and that said Letters Patent is hereby corrected as shown below:

In the Specification

In column 4, line 63, delete "balance" and insert -- Balance --, therefor.

In the Claims

In column 10, line 5, in Claim 17, delete "a said" and insert -- a --, therefor.

Signed and Sealed this
Fourth Day of August, 2015

Michelle K. Lee
*Director of the United States Patent and Trademark Office*